318-135
2/25/86    XR    4,573,094    SR

United States Patent [19]
Gibeau et al.

[11] Patent Number: 4,573,094
[45] Date of Patent: Feb. 25, 1986

[54] MOVING MAGNET DISC DRIVE ACTUATOR

[75] Inventors: Frank C. Gibeau, Los Altos; Paul L. Farmer, San Martin, both of Calif.

[73] Assignee: Atasi Corporation, San Jose, Calif.

[21] Appl. No.: 522,424

[22] Filed: Aug. 10, 1983

[51] Int. Cl.$^4$ .......................... G11B 5/55; H02K 41/02
[52] U.S. Cl. ...................................... 360/106; 310/13; 318/135
[58] Field of Search ............................ 360/106, 97–99, 360/78, 105; 310/12–14, 27; 318/135

[56] References Cited
U.S. PATENT DOCUMENTS

| | | | |
|---|---|---|---|
| 4,414,594 | 11/1983 | Farmer et al. | 360/106 |
| 4,443,721 | 4/1984 | Jansen | 310/14 |
| 4,456,934 | 6/1984 | Wedman et al. | 360/78 |

*Primary Examiner*—John H. Wolff
*Attorney, Agent, or Firm*—Thomas S. MacDonald; Alan H. MacPherson; Steven F. Caserza

[57] ABSTRACT

A transducer actuator assembly (10) for a rotating disc memory apparatus has at least one pair of coils (40, 41) symmetrically spaced from a center plane of a linearly moving carriage (21) where the coils are stationary with respect to a fixed actuator base (11) and surrounding spaced center poles (34) of a magnetic pole piece flux return structure (31, 32, 33) having an E-Shaped configuration closed by pole plate (38). At least one pair of magnets (24a–d or 60, 61) are affixed to and extend horizontally from the sides (23) of the carriage and are spaced in longitudinally extending air gaps (45–48, 49) between the fixed coils and linearly extending pole piece portions (32, 33).

Due to the low mass and small envelope size of the moving carriage-magnets subassembly and the removal of the heat generating coils from the carriage, very rapid access times with high location accuracies are possible along with minimization of magnet field effects on the memory discs being accessed.

13 Claims, 3 Drawing Figures

MOVING MAGNET DISC DRIVE ACTUATOR

CROSS-REFERENCE TO RELATED APPLICATION

This application is related to U.S. Pat. applications Ser. No. 06/352,943 filed 02/26/82 now U.S. Pat. No. 4,414,594 entitled, "Linear Actuator for a Memory Storage Apparatus," inventors: P. Farmer, et al., and Ser. No. 06/437,916 filed 10/29/82 entitled, "Disc Drive Actuator Structure", Inventor: P. Farmer, and assigned to the assignee of this application. The disclosure of such applications are herein incorporated by reference.

BACKGROUND OF THE INVENTION

1. Field of the Invention

The present invention generally relates to memory storage apparatus. More particularly, the invention concerns an improved memory storage apparatus having a linear actuator for reciprocatably positioning a transducer relative to a disc or other media upon which information is recorded. The actuator is referred to as a linear actuator because it is adapted to move the transducer along a straight line that extends generally radially of the media of the memory storage apparatus.

The present invention provides a linear actuator particularly useful in a magnetic memory storage apparatus of the type known in the art as a Winchester magnetic disc memory storage apparatus. The actuator is situated adjacent the peripheries of several vertically spaced memory storage discs and is designed to rapidly position the transducers to access recorded disc information. The transducers normally comprise floating read/write heads. Although the present invention shall be described in connection with the Winchester disc drive unit, it will be appreciated that the actuator will be useful in other types of electromagnetic memory storage apparatus and will also be useful in optical memory storage apparatus wherein an optical transducer or several optical transducers are incorporated in the actuator.

The need for a compact, high-capacity magnetic disc memory storage apparatus has generated much interest in recent years in the Winchester type of disc drive device. Due to the increased track density made possible by recent developments, there has been an ongoing attempt to provide an actuator capable of extremely rapid access time and yet which is compact. Although some actuators have been generally satisfactory, the known prior actuator designs have not been able to meet most of the following objectives: eliminating carriage thermal expansion causing head misalignment on disc tracks; providing sufficiently high magnetic force constants over essentially the whole stroke length of the actuator to both rapidly accelerate and decelerate the carriage, achieve extremely rapid access times while providing a mechanically stiff carriage and head suspension so that the close loop gain of the servo system can be raised such that the heads do not bounce "off-track" due to forces external to the disc drive; eliminating flexible cable connections to the moving parts; providing a very compact design, particularly in the vertical direction; preventing any magnetic bias force to the carriage bearings; providing that head suspensions do not pass through a magnetic field causing information erasure from the discs; and providing a carriage support and drive arrangement of improved reliability and with components which can be easily be replaced and repaired.

2. Prior Art

Various linear motor-driven disc drive actuators have been suggested in which a single-voice coil is mounted on the rear or side of an actuator carriage which coil upon actuation drives the coil/carriage combination past a series of permanent magnets fixed in a fixed pole piece structure. Typically, these are seen in U.S. Pat. Nos. 3,505,544; 3,656,015; 3,659,124; 3,735,163; 4,287,455; 4,287,794; and 4,305,105. U.S. Pat. No. 4,344,022 discloses spaced coils translatable on the surfaces of two center poles of a pole piece structure past a longitudinal series of fixed magnets of alternating polarity and attached to a carriage which coils and carriage are moved together upon actuation and communation of the coils. None of these patents describe a device that meets the above objectives.

SUMMARY OF THE INVENTION

The rotating disc memory storage apparatus of the present invention includes an improved linear actuator which satisfies the aforementioned objectives. The linear actuator includes a carriage, and means for mounting the carriage for recioprocating movement along a linear path that extends generally radially of the rotating disc of the memory storage apparatus. According to the basic feature of the present invention, the carriage is reciprocatably driven by a pair of electromagnetic motors of identical construction that are symmetrically disposed relative to the centerline of the carriage to apply forces to the carriage generally along parallel lines that are laterally spaced and symmetrically disposed relative to the desired linear path of travel of the carriage. Magnets of each of the pair of motors are attached to the carriage so that the magnetic fields associated with each motor provide a consistent force constant as they pass by, in a gap, associated coils fixed to the actuator base. The coils, which are the main source of generated heat, are grounded to the base whereby heat may be easily dissipated through conduction to the base. Fixed connections may be made to the coils so no "flex-type" conductors are necessary which can result in breakage or act to impress a spring constant on the carriage tending to return the carriage to the unflexed position of the conductors.

In the preferred embodiment, the improved actuator assembly of the present invention utilizes two pairs of permanent magnets mounted to the sides of an actuator carriage in a symmetrical relationship relative to a vertical plane through the desired linear path of travel of the carriage. Two separate drive coils are fixedly secured upon the fixed base of the actuator, each coil having at least one effective winding section that registers with pairs of air gaps and associated pairs of magnets extending from the carriage. This arrangement thus provides two linear electromagnetic motors disposed symmetrically relative to the centerline of the carriage. The fixed coils are typically connected to a direct-current actuator controller of the memory storage apparatus.

It is noted that a single-drive coil may be employed instead of separate coils. Such single coil would have effective winding sections at opposite sides of the centerline of the carriage that would form with the outer pole pieces air gaps through which the two pairs of moving magnets may pass. Separate drive coils are preferred due to the shorter current rise time associated with the shorter winding length of each separate coil.

In the preferred embodiment, each pair of magnets is mounted horizontally and extends laterally from opposite sides of the carriage at equal distances therefrom. This arrangement provides two air gaps on each side, symmetrically located at opposite sides of the centerline of the carriage. The coils fixedly mounted to the actuator base have a rectangular outline (or outlines) in a plane normal to its direction to travel to thus provide effective winding sections which register with the respective air gaps and include a center pole in their inner periphery. The pair of magnets are attached like bi-planar wings on the carriage. The magnets will traverse its associated drive coil and a force thereby applied to the carriage generally along a line extending parallel to and equidistant from the center of the carriage when the coils are actuated. The coils are rectangular in configuration so that a flat expanse of magnet rides past a flat expanse of fixed coil turns.

The preferred arrangement for reciprocatably mounting the carriage to the base of the memory storage apparatus includes two pairs of rollers mounted directly under the centerline and another pair of rollers located directly over the centerline of the carriage as is disclosed in the related application. Preferably, the carriage rides on a fixed guide rail mounted to the base of the apparatus midway of a vertical plane between the two pairs of magnets, and a preloaded guide rail is biased downwardly against the single pair rollers at the top end of the carriage. The two pairs of rollers are longitudinally spaced so that they stabilize the carriage in its longitudinal direction. Due to the symmetrical application of forces by the two motors at opposite sides of the carriage, the centrally disposed two-rail carriage support arrangement is sufficient to accurately guide the carriage with minimal vibration. The magnets extend in a horizontal plane between the respective sets of top and bottom rollers.

In another embodiment, fixed coil sections are employed with a pair of magnets cantilevered from the side of the carriage which magnets traverse an air gap between pairs of coils fixedly positioned above and below the top and bottom surfaces of the cantilevered magnets on both sides of the carriage.

DETAILED DESCRIPTION OF THE DRAWINGS

Figure 1:
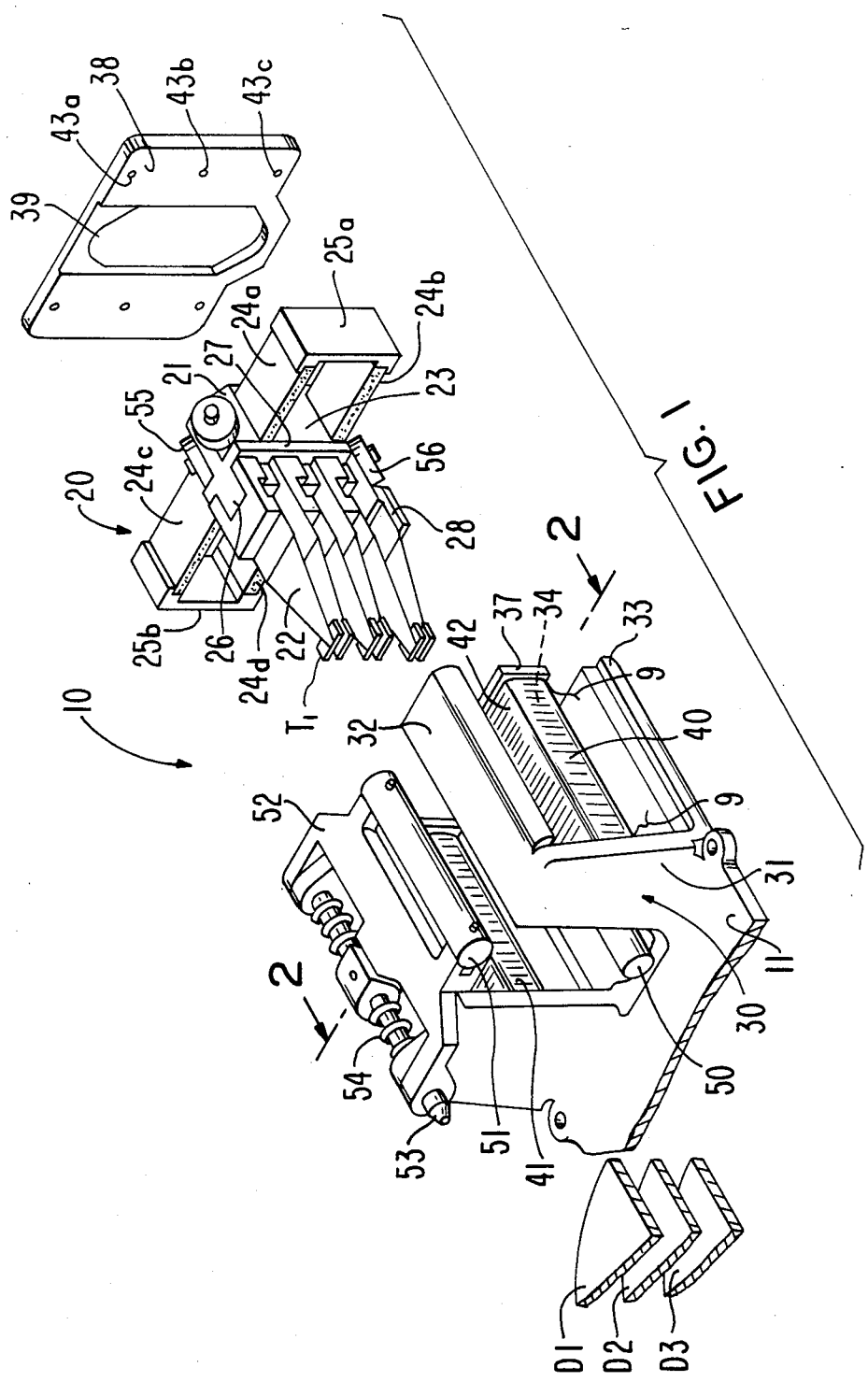
FIG. 1 is an exploded isometric view illustrating the preferred embodiment of the linear actuator assembly of the present invention.

Referring to FIG. 1, an actuator assembly 10 comprises a magnet-containing movable carriage subassembly 20 and a fixed pole piece and coil subassembly 30 which together form a pair of electromagnetic voice coil linear motors mounted on opposite sides of the carriage in symmetrical spaced positions from a vertical plane extending through the center of the carriage. The carriage subassembly comprises a reciprocating carriage 21 which is movable into very large number of incremental positions relative to the pole piece and coil assembly so as to position the transducers over various tracks on magnetic information storing discs D1, D2, and D3 which are mounted on a rotatable spindle as is known in the art. Typically a transducer T1 is positioned over a particular track (one of normally 600–1000 tracks per inch) on the disc D1 top surface to either read or write magnetic information on that track. Multiple transducers are held at the end of multiple arms 22 extending cantilevered from carriage 21 along its linear axis. Arms 22 are attached to arm supports 26 extending from the front edge of carriage 21 from a surface 27. The inboard portion of lowermost arm 22 seats on a lower arm support 28.

Four magnets 24a–d extend at right angles from and are affixed to sides 23 of the carriage. The preferred magnets are rare earth magnets such as sumarium cobalt magnets which have a high (approximately 8000 gauss) energy force. Use of these magnets results in more efficient transmission of the lines of magnetic flux through the air gaps. Rare earth magnets are available from Permag, Inc. of Sunnyvale, Calif. A high gauss magnetic field is thus applied with minimal gauss field degradation on the magnet perimeter ends. Each pair of magnets on each side of the carriage is supported at their outboard ends by suitable C-shaped frame supports 25a and 25b to prevent flutter or vibratory movement of the magnet span. The ends of the magnets may be bonded to the supports and the carriage sides by an adhesive.

The carriage further comprises a single pair of rollers 55 extending from angular surfaces on the carriage top and a double pair of rollers 56 extending from angular surface at the carriage bottom thus allowing a three-point suspension of the carriage on fixed linear rails.

The pole structure and coil subassembly 30 comprises a base plate 11 which is normally mounted on an actuator housing bottom (not shown). Integral spaced flux return pole pieces 31 extends vertically from base 11. Each has a pair of horizontal exterior pole pieces 32 and 33 and a center pole piece 34 on each side extending therefrom to form an E-shaped configuration. Coils 41 and 42 are fixedly mounted or are in sliding relation to the center poles 34 and extend over the pole length. The coils are rectangular in cross-section with a major axis of the coil forming a coil surface 42 facing a longitudinally-extending air gap between the coil and the exterior pole pieces. In one embodiment of the invention utilizing samarium cobalt magnets the pole pieces 32 and 33 may be brought closer together than shown in FIG. 1 while still providing sufficient gap for the moving magnets. This allows for a more compact structure, particularly in the vertical direction. Such miniaturization results in less surface area and therefore less chance of chips or contaminants which may fly off to interfere with the magnetic charges on the discs. The center poles and coils are symmetrical with the center plane of the carriage in both the vertical and horizontal directions.

The assembly 10 is assembled by inserting the carriage subassembly 20 into the pole piece and coil subassembly 30 wherein the magnets 24a–d and their supports 25a and b surround in spaced relation a partial length of coils 40 and 41 and are within the longitudinally-extending air gaps. Rollers 55 and 56 are guided and supported on horizontal fixed guide rails 50 and 51 extending from a bottom position of base 11 and the top of one of the pole pieces 32, respectively. The upper rail 51 is preloaded and biased downwardly against the upper single set of rollers 55 by an arm 52 connected to a pivot 53 and spring-pressed downwardly by spring 54. The assembly operation is completed by affixing a rear pole piece 38, having an aperture 39 to receive the rear end of carriage 21 in the "out" position relative to the discs D1, etc., to the three horizontal parts 32–34 of the pole pieces by suitable screw threaded fasteners or the like extending through apertures 43a–c into threaded apertures (not shown) in the ends of members 32–34. If desired center poles 34 may contain a shorted turn of copper extending therearound and over its length along the inner periphery of the coils 40 and 41.

In the event of a break or analomy in a coil, a coil replacement can easily be made merely by removing the rear pole plate 38 and slipping the coil off of its center pole. In the prior art devices the coils are normally bonded to the carriage and their replacement involves a major disassembly or the scrapping of the particular subassembly.

As is known, coils are generators of heat. Grounding of the fixed coils to fixed structure such as the center poles allows for better heat dissipation than when the coils are part of the carriage moving means as in the prior art. This acts to eliminate carriage thermal expansion and resultant temperature-induced off-track positioning of the transducers. In prior art devices this was compensated for by the utilization of special materials of construction between the transducer arms and the carriage at an extra expense not incurred by the present invention.

The placement of the dual magnets on the carriage eliminates the need of any flexible electrical connection to the coils which formerly was necessitated when the coils were attached to the carriage. Not only were the flex connections subject to breakage from fatigue, but they provided a spring constant tending to return the flex connection to a neutral position which tended to return the carriage to that same position.

Operation of the assembled device seen in FIG. 1 involves actuation of the fixed coils through suitable leads 9 to a conventional direct current drive circuit (not shown). Average access times of about 25 milliseconds or less are possible using closed loop positioning to access 50–350 megabytes of unformatted storage. Movement of the magnets with respect to incremental longitudinal positions of the fixed coils results in the creation of a consistent magnetic force constant from the magnet/coil gauss field relationship. In the prior art voice coil actuators the magnetic flux concentration fell off when the moving coil(s) passed the ends of the magnet(s) where less magnetic flux is emitted.

Having the magnets attached to the carriage eliminates bias magnetic forces to the carriage bearings. The bottom rollers of the prior art have a magnetic effect interconnecting the lines of magnetic flux from non-linear fixed magnets as the moving coils passed by the fixed magnets. In the disclosed invention there is no variation since the magnets in each similar increment of travel with respect to the fixed coils pass by a constant number of coil turns. Typically, 5–7 coil layers, dependent on wire size, form the overall coils.

Since the head suspensions including the transducers and arms are always a fixed distance from the magnets, since each are fixed to the carriage, they cannot pass through a magnetic field from permanent magnets, pick up a magnetic charge and cause erasure by magnetic conduction of the magnetic information on a disc track. If desired, the transducer arms and transducer may be shielded from incidental flux by a magnetically soft material such as a steel wall over the forward-facing edge of the magnets.

Magnet supports 25a and b may be made of a nonmetallic material or plastics, the latter preventing eddy-currents from interfering by opposing or resisting motion being induced in moving a conductive material through a field. The described moving carriage with attached wing-like magnets results in a very symmetrical structure of low mass which can access disc tracks with great rapidity.

Figure 2:
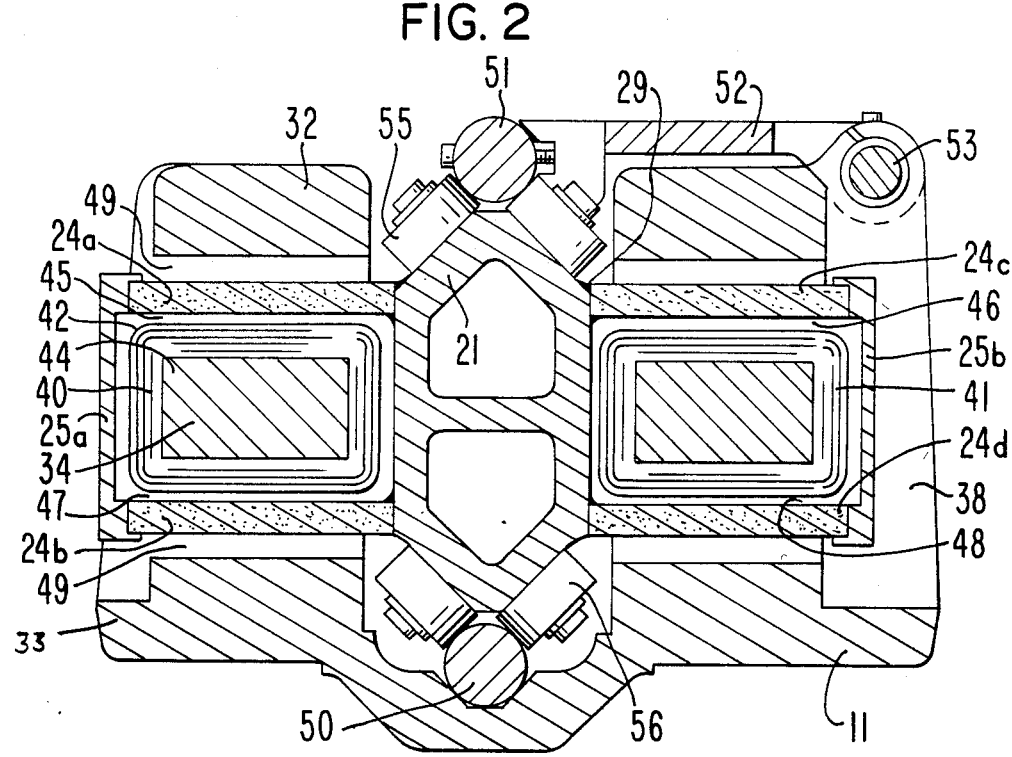
FIG. 2 is a cross-sectional view of the assembled actuator taken on line 2—2 of FIG. 1.

FIG. 2 more clearly shows the slab magnets 24a–d positioned in air gaps 45–48 between horizontal sections 42 of the rectangular coils 40 and 41 and the coil-facing sides of the magnets. The opposite sides of the slab magnets are spaced by air gaps 49 from the upper and lower pole pieces 31, 32 at the bottom and or top. A shorted turn may be placed around surface 44 of center poles 34. Air gaps 45–48 have a vertical height typically in a range of from 0.010 to 0.030 inches and air gaps 49 have a vertical height, typically in the range of 0.010 to 0.030 inches. Overall dimensions of an actuator suitable for a 5¼ inch Winchester-type disc drive are height 3.25 inches, width 5.75 inches and length or depth 8.00 inches. In a typical embodiment the stroke length of the carriage is 1 to 1.5 inches. The width of the magnets (in the linear moving direction) is 0.5 inches and the coil has a length of 1.75 inches. The magnet width distance along the direction of movement is preferably from 25 to 40% of the fixed coil linear distance along that direction.

Figure 3:
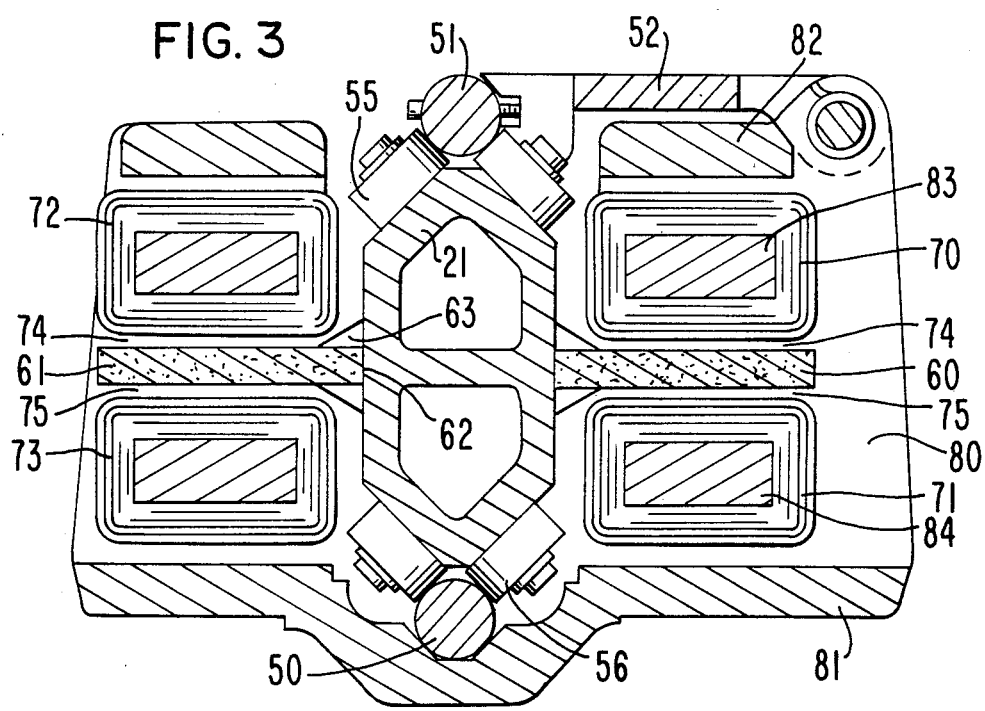
FIG. 3 is a cross-sectional view of another embodiment of the actuator taken from the same reference plane as in FIG. 2.

FIG. 3 shows a second embodiment of the invention in which single slab magnets 60 and 61 are centrally and horizontally mounted in monoplanar configuration by adhesive or other means at point 62 on the carriage 21. They extend equidistant from the carriage vertical center plane. Four coils 70–73 are fixedly positioned over center poles 83, 84 with the center axis of the coils spaced at the corners of a rectangular plane vertically and symmetrically disposed to the linear path of carriage travel. The coils are spaced from the wing-like cantilevered magnets contained in a flat rectangular horizontal movable plane by air gaps 74, 75. Return magnetic flux flows through the center poles, actuator base 81, horizontal pole pieces 82 and end pole plate 80. Magnets 60 and 61 may be outwardly tapered to correct any resonant vibration caused by rapid movement in the air gaps. The embodiment of FIG. 3 has more coil surfaces (4) facing the magnets which are of larger diameter but with less turns and thus has a lower coil efficiency. The expense of the added coils must be balanced against the cost of the four magnets in the FIG. 1 and 2 device. Alternatively, if a very vertically compact design is sought, a single pair of magnets may be used with one pair of coils fixed either above or below the extending movable magnets with air gaps therebetween. In a still further embodiment the fixed coils may be circular in cross-section and the magnets mounted on the carriage of a similar circular or semi-circular configuration so as to ride in an annular air gap between the coils and circular or semi-circular exterior pole pieces.

With the use of thin, i.e., about ⅛ inch thick, rare earth samarium cobalt magnets, the height of the actuator over prior art actuators may be substantially shortened, resulting in substantial compression of the overall envelope size, even smaller than those dimensions recited above.

The above description of the advantages and the preferred embodiment of this invention is intended to be illustrative only, and not limiting. Other embodiments of this invention will be apparent to those skilled in the art in view of the above disclosure.

We claim:

1. A transducer actuator assembly for a rotating disc memory apparatus comprising:
   a base plate;
   a carriage;
   means for mounting at least one transducer on the end of said carriage;
   a rotating disc for storage of magnetic information;
   means adjacent to an outer periphery of the rotating disc for guiding the carriage for movement with respect to said base plate along a desired linear travel path relative to the rotating disc;
   at least one pair of fixed linearly extending coils each coil being of identical effective coil section fixed with respect to said base plate and symmetrically spaced about a plane that extends through the center of said carriage;
   at least one pair of magnets fixedly connected to and extending laterally from opposite side walls of said carriage extending parallel to said linear travel path and in juxtaposed spaced relation with a linear portion of said linearly extending coils forming at least two air gaps between said magnets and said coil sections on opposite sides of said carriage;
   pole means forming a magnetic flux return path around said magnets and said coils; and
   means for rigidly mounting said pole means to form air gaps between said pole means and said magnets.

2. The invention of claim 1 wherein said coils comprise two fixed horizontally extending coils equally spaced from said carriage and wherein said magnets comprise four magnets connected to said carriage and wherein in operation and said coil means are energized to apply motive forces to said magnets which linearly reciprocate past portions of said coil sections.

3. The invention of claim 2 in which two of said magnets extend laterally and horizontally from said carriage above and below each of said fixed coils.

4. The invention of claim 3 including means for connecting the laterally extending ends of each pair of magnets extending from one side of the carriage.

5. The invention of claim 1 wherein said coils extend over a linear distance greater than the desired linear travel path of said carriage and said magnets have a linear dimension in the direction of said linear travel path of from 25 to 40% of said coil linear distance.

6. A transducer actuator assembly for a rotating disc memory apparatus comprising:
   a base plate;
   a carriage;
   means for mounting at least one transducer on the end of said carriage;
   a rotating disc for storage of magnetic information;
   means adjacent to an outer periphery of the rotating disc for guiding the carriage for movement with respect to said base plate along a desired linear travel path relative to the rotating disc;
   at lest one pair of fixed linearly extending coils each coil being of identical effective coil section fixed with respect to said base plate and symmetrically spaced about a plane that extends through the center of said carriage;
   at least one pair of magnets fixedly connected to and extending laterally from opposite side walls of said carriage and in juxtaposed spaced relation with a linear portion of said linearly extending coils forming at least two air gaps between said magnets and said coil sections on opposite sides of said carriage;
   pole means forming a magnetic flux return path around said magnets and said coils;
   means for rigidly mounting said pole means to form air gaps between said pole means and said magnets; and
   wherein said coils comprise a set of four fixed coils having their center axes spaced at the corners of a first rectangular plane vertically and symmetrically disposed to the linear travel path of said carriage forming upper and lower pairs of spaced coils and wherein said magnets comprise two horizontally disposed magnets disposed in a flat rectangular horizontal movable plane between said upper and lower pairs of said spaced coils.

7. The invention of claim 6 in which said two magnets are mounted on single wings extending from each side of said carriage and between each set of vertically disposed upper and lower sets of coils.

8. In a magnetic disc memory storage apparatus including a base, at least one disc, means rotatable with respect to the base for rotating said at least one disc, a transducer for accessing information magnetically recorded in said at least one disc and an actuator assembly for moving the transducer along a straight line to distal track location on said at least one disc, the improvement comprising a carriage, means for guiding the carriage in a linear path adjacent the periphery of said at least one disc and electromagnetic means, transversely spaced from opposite sides of carriage for applying equal and separate motive forces to said carriage, including
   at least two spaced coil means on an electromagnetic pole means;
   means forming air gaps between said coil means and portions of said pole means;
   at least two spaced magnets fixedly attached to opposed sides of said carriage in a position within said air gaps, wherein upon energization of said coil means a motive force is applied to said magnets and said carriage.

9. The invention of claim 8 in which said pole means include a pair of spaced center poles, said coil means being slidably fitted on respective ones of said center poles.

10. The invention of claim 8 in which said magnets are four in number and extend in gaps between an outer section of said pole means and parallel outer surfaces of said coil means.

11. The invention of claim 8 in which said coil means are rectangular in cross-section and said magnets extend parallel to horizontal surfaces on said rectangular coil means.

12. The invention of claim 8 in which said coil means and said magnets are symmetrically spaced with respect to a center plane of said carriage along said linear path.

13. In a magnetic disc memory storage apparatus including a base, at least one disc, means rotatable with respect to the base for rotating said at least one disc, a transducer for accessing information magnetically recorded in said at least one disc and an actuator assembly for moving the transducer along a straight line to distal track location on said at least one disc, the improvement comprising a carriage, means for guiding the carriage in a linear path adjacent the periphery of said at least one disc and electromagnetic means, transversely spaced from opposite sides of carriage for applying equal and separate motive forces to said carriage, including
    at lest two spaced coil means on an electromagnetic pole means;
    means forming air gaps between said coil means and portions of said pole means;
    at least two spaced magnets fixedly attached to opposed sides of said carriage in a position within said air gaps, wherein upon energization of said coil means a motive force is applied to said magnets and said carriage; and
in which said pole means includes two pairs of said center poles, said coil means being four in number and being slidably fitted on each of said four center poles.

\* \* \* \* \*